Aug. 22, 1939.  G. T. PFLEGER  2,170,212
VARIABLE RATIO TRANSMISSION DEVICE
Filed Feb. 19, 1934  3 Sheets-Sheet 1

INVENTOR
George T. Pfleger
BY John Flam
ATTORNEY

Aug. 22, 1939.   G. T. PFLEGER   2,170,212
VARIABLE RATIO TRANSMISSION DEVICE
Filed Feb. 19, 1934   3 Sheets-Sheet 2
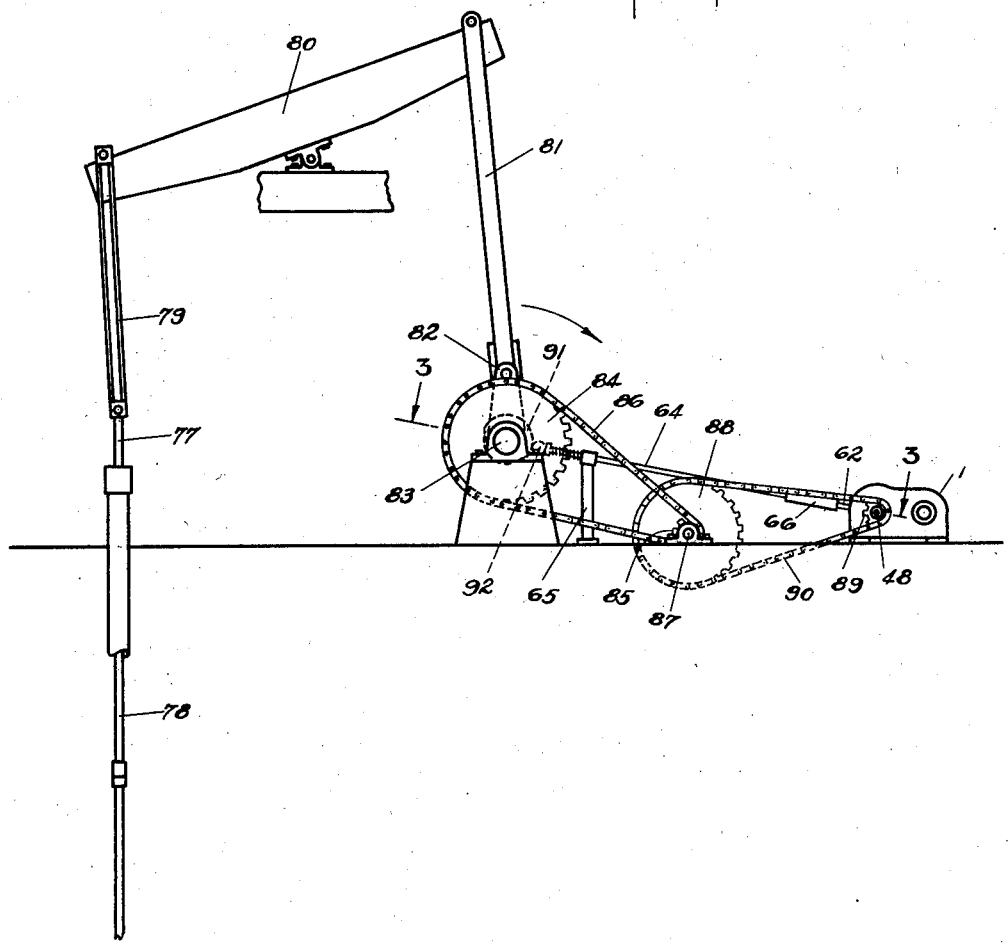

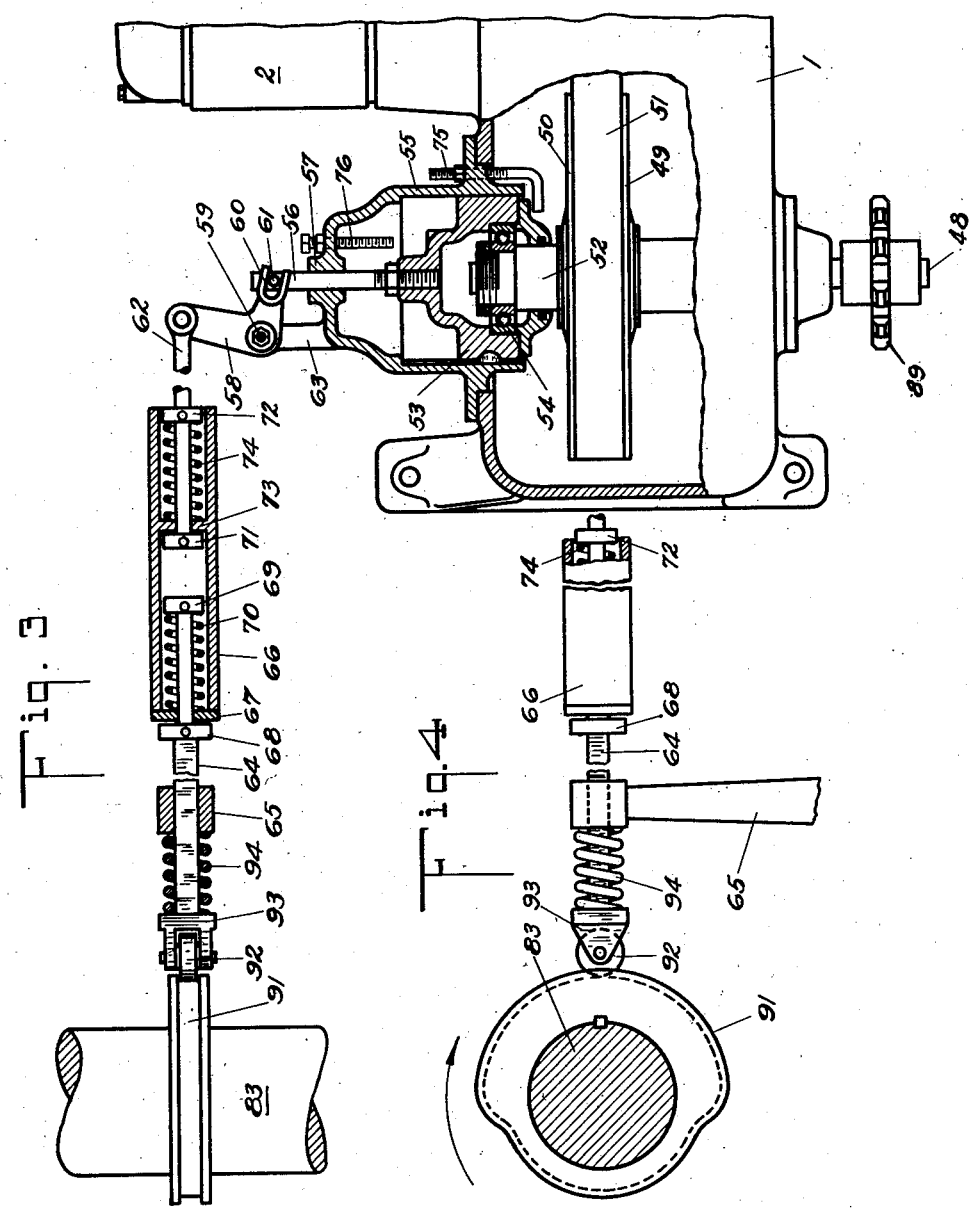

Patented Aug. 22, 1939

2,170,212

UNITED STATES PATENT OFFICE 2,170,212

VARIABLE RATIO TRANSMISSION DEVICE

George T. Pfleger, Los Angeles, Calif., assignor to U. S. Electrical Motors, Inc., a corporation of California Application February 19, 1934, Serial No. 711,919

10 Claims. (Cl. 74—230.17)

This invention relates to a device for varying the ratio of power transmission from the shaft of a source of power, such as an electric motor. More particularly, it relates to a device utilizing belt pulleys the diameters of which can be adjusted.

Such pulleys include a pair of relatively axially movable pulley sections mounted on a shaft, and having opposed inclined faces. A flexible belt of wedge shaped section engages respectively at its opposite sides, the inclined faces. When the faces are closer together, the belt is at a greater radial distance from the axis, and the effective pulley diameter is greater. When the faces are farther apart, the belt is permitted to move inwardly, toward the axis, and the effective diameter is reduced.

It is apparent that when the pulley structure is at a standstill, the effective diameter cannot be increased because the belt prevents the movement of the inclined faces toward each other. When the pulley is rotated, this adjustment can be accomplished, since the belt gradually rides outwardly of the pulley sections.

In some types of applications, it is essential to provide a setting of the pulley structure to minimum speed transmission prior to the operation of the transmission. For example, in electric motor drives, the driven pulley structure should be at maximum diameter so that the load is started at minimum speed, thereby imposing favorable torque requirements on the motor during the starting period.

It is accordingly one of the objects of the invention to make it possible to preset the ratio of transmission at standstill, whereby after a few revolutions of the motor, this setting becomes effective.

This result is accomplished by providing a resilient member between the device which is moved for providing the adjustment, and the pulley section or sections the axial position of which it is desired to adjust. In this way, the adjusting member can be moved to a definite position, corresponding to a definite setting of pulley diameter, and the resilient member is compressed until the apparatus is set in motion; and when the device is started, the pulley sections automatically move toward each other to effect the adjustment, the spring or yielding member meanwhile expanding.

The intermediate spring arrangement is capable of use in other combinations. For example, when a motor is used to drive a periodically fluctuating load, such as a sucker rod pump for oil well pumping, the force requirements during upward movement of the sucker rods are far greater than during downward movement thereof. This is due to the fact that during upward movement, a column of liquid as well as a long string of rods are lifted; and during downward movement, gravity assists in lowering the rod string. When an electric motor is used to oscillate the walking beam of the pump, the motor load fluctuates for each oscillation, and the motor alternately races and slows down.

It is possible by the aid of this invention, to vary the ratio of transmission from the motor to the walking beam, in such manner that the motor exerts a greater force at lower speed during upward movement of the sucker rod. In this way, wide fluctuations in the motor load are very materially reduced.

It is accordingly another object of the invention to make it possible to vary the ratio of transmission in substantial synchronism with the fluctuations of a periodically variable load. This is accomplished by providing a mechanism actuated in synchronism with the load variations, for adjusting the transmission ratio. This mechanism is so arranged that the adjusting act can be substantially instantaneous, the pulley adjustment following cyclically thereafter. A yielding member is included in the mechanism whereby this presetting is accomplished.

This invention possesses many other advantages, and has other objects which may be made more easily apparent from a consideration of several embodiments of the invention. For this purpose there is shown a few forms in the drawings accompanying and forming part of the present specification. These forms shall now be described in detail, illustrating the general principles of the invention; but it is to be understood that this detailed description is not to be taken in a limiting sense, since the scope of the invention is best defined by the appended claims.

Referring to the drawings:

Fig. 2 is a diagrammatic view showing the invention adapted to pump equipment;

Fig. 3 is a sectional view taken along the plane 3—3 of Fig. 2, but with some of the parts broken away to reduce the size of the figure; and Fig. 4 is a detail view taken from the bottom of Fig. 3.

Figure 1:
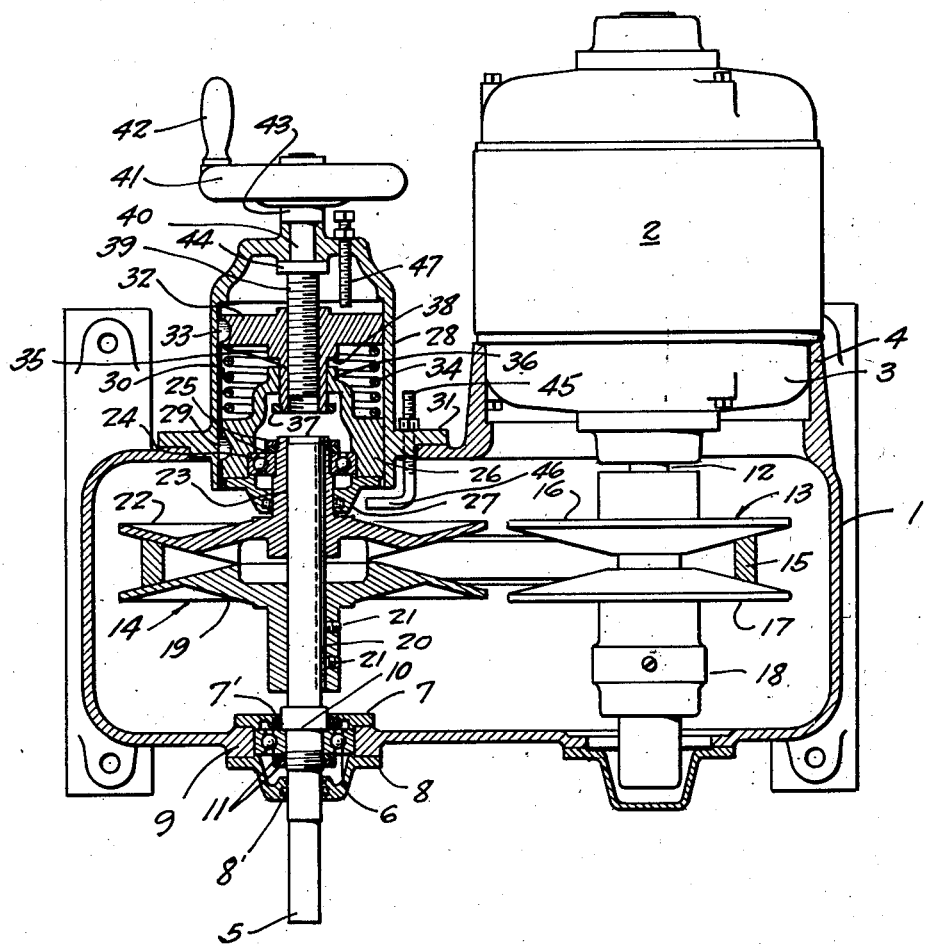
Figure 1 is a horizontal sectional view of a power unit in which the invention is incorporated.

In Fig. 1 there is shown a casing 1 in which are housed the elements forming the variable ratio transmission device. The source of mechanical power is an electric motor 2. This electric motor has an end bearing support 3 which is appropriately held in the deep flange 4 projecting from one side of the casing 1.

A shaft 5 is axially spaced from the axis of motor 2 and is adapted to drive any appropriate load. It projects out of the casing 1, and is appropriately journalled at one end therein, as by the aid of the ball bearing structure 6. The outer race of this ball bearing structure is supported between the inner and outer caps 7 and 8 respectively fastened to the opposite sides of the boss 9 in casing 1. Each of these caps can be provided with dust guards in the form of felt washers 7' and 8'. The inner race of the ball bearing structure 6 is tightly held against a shoulder 10 on shaft 5 as by one or more clamping nuts 11.

The motor shaft 12 is in driving relation to the shaft 5 as by the aid of the variable diameter pulley structures 13 and 14, mounted respectively on shafts 12 and 5; and a belt 15 of wedge shaped cross section, engaging the variable pulley structures.

Each of the pulley structures includes a pair of relatively axially adjustable sections, having opposed inclined faces engaged by the opposite sides of the belt 15. Thus in the present instance the driving pulley structure 13 includes a fixed section 16 and an axially movable section 17. The pulley section 17 is urged continuously toward the section 16 as by the aid of a compression spring 18 in housing 18. In this way the effective diameter of pulley structure 13 automatically varies to take up all belt slack and to accommodate itself to the variations in the effective pulley diameter of structure 14.

Structure 14 includes the axially fixed section 19 which is fastened to the shaft 5 as by the key 20 and set screws 21. The opposite section 22 is splined on key 20 to be in driving relation with shaft 5, and it is axially movable toward and from the section 19. It is apparent that when section 22 moves toward section 19, the effective diameter of pulley structure 14 is increased. While the apparatus is running, such an adjustment in diameter causes the belt 15 to ride outwardly in a radial direction between the sections 19 and 20, and to act upon section 17 to urge it axially away from section 16. During this adjustment, the belt 15 moves in a direction parallel to the axes of shafts 5 and 12 and is kept in alinement, because as it rides down the face of pulley section 16, it rides up on the face of pulley section 19.

Conversely, when pulley section 22 is moved away from pulley section 19, the pulley section 17 moves toward pulley section 16 to take up the resulant belt slack, and the belt 15 moves radially outwardly on pulley section 16, and radially inwardly on pulley section 19.

In order to provide a further bearing support for shaft 5, pulley section 22 is provided with an elongated hub 23. Against a shoulder of this hub is fastened the inner race of a thrust ball bearing structure 24. This inner race can be held in position as by the aid of one or more clamp nuts 25 threaded on the extremity of hub 23. The outer race of ball bearing structure 24 is held firmly between an axially adjustable cylindrical member 26 and a cap 27 fastened thereto. It is apparent that axial adjustment of member 26 causes a corresponding adjustment of pulley section 22, with an attendant variation in effective pulley diameter. It is also apparent that movement of pulley section 22 toward pulley section 19 reduces the ratio of transmission between driving shaft 12 and driven shaft 5. While the apparatus is at a standstill, this reduction in transmission ratio is not possible, because of the fact that the belt 15 acts as a separator between the section 19 and 22 and precludes movement of section 22 with respect to section 19.

By the aid of the apparatus now to be described, however, it is possible to preset the position of section 22 while the apparatus is at a standstill, and after the apparatus is started, the belt moves outwardly to the desired position between sections 19 and 22. This takes place in the first revolution or so of the pulley structures.

It is thus apparent that it is possible by this means to ensure that motor 2 will be started without extreme requirements of starting torque. The manner in which this presetting function is secured will now be described.

The member 26 is guided in a stationary tubular member 28 and is constrained against angular motion, as by the aid of a key 29 working in a slot 30 in the inner wall of member 28. In this way a spline is formed between members 26 and 28.

Member 28 has a flange 31 by the aid of which it may be secured to the edge of an aperture in casing 1 through which the member 28 extends.

Member 28 also accommodates a manually axially adjustable member 32. The adjustable member 32 is likewise splined against angular motion as by the aid of the key 33 accommodated in the slot 30. Member 32 is connected to member 26 through the intermediary of a resilient member, such as a compression spring 34 accommodated inside of member 28 and interposed between members 26 and 32. Member 32 has an extending boss 35 which is slidable inside an aperture in the extension 36 of member 26. The extent of relative axial movement between members 26 and 32 is limited by providing a collar 37 on the inner end of extension 35, and by providing a shoulder 38 on the extension 35. The member 32 is arranged in this instance to be manually adjusted in an axial direction as by the aid of a screw 39 engaging threads in a central aperture in member 32. This screw has a bearing member 40 in an aperture in the member 28 and carries a hand wheel 41 provided with a handle 42. Handwheel 41 has a hub 43; and this hub in conjunction with a collar 44 on the screw 39 prevents axial motion of the screw 39.

It is apparent that as handwheel 41 is rotated in either direction, the axial position of member 32 is adjusted.

Spring 34 is so chosen that it will exert sufficient force to move member 26 to the limiting position, determined by the contact of extension 36 of member 26 with collar 37, in opposition to the axial force created by the heaviest loads to be imposed on the mechanism.

Appropriate limits to the axial adjustment of pulley section 22 can be provided. For example, a stud 45 can be adjustably fastened through the flange 31, and can be provided with a right angled extension 46 extending beneath the cap 27. This extension 46 acts as a stop for the inward movement of member 26. Similarly, outward movement of member 32 can be limited by an adjustable screw bolt 47 extending through the end wall of member 28.

The mode of operation of this form of the invention can now be described. In the position shown the ratio of transmission from shaft 12 to shaft 5 has an intermediate value, the belt 15 being intermediate in position between the outer edges of the pulley structures and the axes of the respective shafts. The members of the speed adjusting mechanism are shown in the resultant position immediately following an adjustment to decrease the speed ratio of the driven shaft. The spring 34 is shown compressed, as in response to a rapid rotation of hand wheel 41 during the operation of the motor or to a rotation of hand wheel 41 while the motor is stopped. In this position spring 34 urges pulley section 22 against the side of belt 15. If driven shaft 5 is now rotated pulley section 22 can move toward pulley section 19 urging belt 15 radially outward to define a larger effective pulley diameter for pulley structure 14. At the same time belt 15 is drawn radially inward on the driving pulley structure to define a smaller effective pulley diameter. To accomplish this movement pulley section 17 moves axially away from pulley section 13 compressing the spring provided in chamber 18. This simultaneous adjustment of the two pulley structures continues until pulley section 22 arrives at the axial position determined by the contact of members 36 and 37. At the end of the adjusting period spring 34 is expanded to the maximum length permitted by the structure. The collar 37 is then in contact with the lower surface of boss 36. Thus the axial force on the belt now is determined by the spring provided in chamber 18.

To increase the speed ratio of the driven shaft, handwheel 41 is rotated in the direction required to retract member 32. This axial motion is transmitted by the contact of members 36 and 37 to pulley section 22; thus pulley section 22 is withdrawn axially from pulley section 14 to define a smaller effective pulley diameter. If this motion takes place rapidly or while the motor is at standstill, the belt will be allowed to become slack. However, upon rotation of the motor shaft, the spring in chamber 18 urges pulley section 17 toward section 13 to define a larger effective driving pulley diameter. This action continues until the belt slack is taken up.

It is to be noted that for each setting of the hand wheel, upon termination of the adjusting period, the mechanism assumes a position of definite fixed ratio between the speeds of the driven and driving shafts.

It is apparent from the construction that the largest axial force which can be imposed upon the belt is that due to spring 34.

If a resilient speed adjusting means is not employed, very large crushing forces may be imposed on the belt as a result of attempts to adjust the speed ratio while the motor is at standstill, or due to attempts to adjust the speed too rapidly while the motor is in operation.

By the present construction the driven speed can be predetermined before the motor is started. Handwheel 41 can be rotated to any desired position, within the limits of the mechanism. Upon starting the motor, the pulleys adjust themselves in a few revolutions to the speed ratio determined by the initial setting of the speed adjusting mechanism.

It is thus always possible to start the load at a low speed. It is apparent that in this way the torque requirements during the starting period can be very materially reduced. In prior devices of this character, it was necessary to start the motor 2 before such an adjustment could be accomplished.

The resilient adjusting means can be interposed between the actuating means and the adjustable pulley structure in a variety of ways; for example, in the form shown in Figs. 2, 3, and 4, the driven shaft 48 carries an adjustable pulley structure having the axially fixed section 49 and the axially movable section 50 between which the flexible belt 51 is arranged. As before, the pulley section 50 has a hub 52 and it is journalled in an axially movable member 53, as by the thrust ball bearing 54. Member 53 is splined in an axial guide 55 and can be adjusted by axial movement of a rod 56 fastened to the adjustable member 53. This rod 56 extends through a guiding boss 57 of the guide member 55. It can be moved axially as by the aid of a crank lever 58. The axial motion of pulley section 50 may be limited by stops 75 and 76 similar to those provided for pulley section 22 of Fig. 1.

The crank lever 58 is fulcrumed on a pivot 59, supported on upright standard 63. This standard can be formed integrally with the guide member 55. The crank 58 has a bifurcated clevis 60 engaging the transverse pin 61 in the rod 56. Crank 58 is arranged to be adjusted by the aid of a link member 62 which can be moved back and forth to vary the axial position of member 53. The lever 58 can be fulcrumed in upright standard 63, formed in this instance integrally with the guide member 55.

A two part link structure is formed, in which member 62 forms one part. The parts form relatively movable members by the aid of which the length of the link structure is variable. Thus for example, the link 62 cooperates with another link member 64 guided for movement in an upright bracket 65. This member 64 carries a tubular member 66 in which the link member 62 is telescoped. Tubular member 66 is provided at one end with a cap 67 which also forms a bushing for link 64. Link 64 is provided with two axially adjustable collars 68 and 69. Collar 68 is urged into contact with cap 67 by a compression spring 70 interposed between cap 67 and collar 69. Link 62 is provided with axially adjustable collars 71 and 72. Collar 71 is urged into contact with bushing 73, secured to tubular member 66, by compression spring 74 interposed between bushing 73 and collar 72.

Consider the link structure in the position shown in Fig. 3. Assume link 62 to be fixed. Consider the resulting action when link 64 is moved toward link 62. Collar 68 bears against cap 67 causing tubular member 66 and the attached bushing 73 to move with link 64. Bushing 73 moves toward collar 72 compressing spring 74. If link 62 is now allowed to move, spring 74 will expand moving collar 72 and the attached link 62 until collar 71 comes into contact with bushing 73. The initial movement made by link 64 will be transmitted to link 62 at that time, when link 62 is free to move in response to the compression force of spring 74.

Consider the case when link 62 is fixed and link 64 is moved away from link 62. In this instance a movement of link 64 compresses spring 70 between collar 69 and cap 67. Member 66 is restrained from motion by the content of bushing 73 with collar 71. If link 62 is now allowed to move, spring 70 expands until collar 68 and cap 67 come into contact, at which time all the motion has been transmitted to link 62.

It is apparent from the construction that the amplitude of the motion of link 64 can be greater than that of link 62 without producing any larger forces on the variable speed power unit than those produced by compression springs 70 and 74. It is therefore not necessary to limit the motion of the means actuating the speed adjustment to that value which can be accommodated by the limiting positions of the variable speed power unit, as any excess motion can be accommodated by the resilient connection between members 62 and 64.

The resilient adjusting means of Fig. 3 may be applied to a variable speed power unit in which both the driving and driven pulley structures are positively adjusted. The axial adjustment of the movable pulley section 50 of the driven shaft may be interlocked by means of any suitable lever system with the axial adjustment of a similar pulley section of the driving shaft. For each position of link 64, upon termination of the adjusting period, the variable speed power unit will assume a position of definite and fixed ratio between the speeds of the driven and driving shafts.

It is apparent from the construction that link 64 may be moved suddenly at any speed or while the motor is at standstill. In this case, upon rotation of the motor, the belt and pulleys will adjust themselves to the new positions determined by the initial setting of link 64.

However, in the present instance the mechanism of Figs. 2, 3 and 4 is shown as applied to a periodically varying load, and is so arranged that the speed of the driven mechanism is reduced during the periods of heavy load, and is increased during the periods of light load. This is accomplished by a to and fro motion of link member 64, in synchronism with the load variations. As an example of such a variable load, reference is made to Fig. 2. In this case there is a polished rod 77 operating to lift oil from a deep well. The polished rod is attached to a vertical string of sucker rods 78 extending downwardly in the earth to a reciprocating pump mechanism. Polished rod 77 is connected as by a link 79 to a walking beam 80. The walking beam 80 is arranged to be oscillated by a connecting rod 81. The lower end of connecting rod 81 is attached to a crank 82 fastened to a rotatable load driving shaft 83. This shaft can be driven through reduction gearing, such as sprockets and chains from the shaft 48. For example, sprocket wheel 84 can be driven by a small sprocket 85 and a chain 86. The sprocket 85 is fastened to a shaft 87 upon which a large sprocket wheel 88 is accommodated. Large sprocket wheel 88 is in turn arranged to be driven by the small sprocket wheel 89 fastened to shaft 48 and in driving relation with wheel 88 as by the aid of the chain 90.

It is apparent that as shaft 83 is rotated in a clockwise direction, the connecting rod 81 will be pulled downwardly and then will be pushed upwardly to oscillate the walking beam 80. The downward pull on rod 81 corresponds to the period of heavy load during the cycle of a single revolution of shaft 83. This heavy load comprises the lifting of the string 78 and the corresponding pumping of the oil. An upward movement of rod 81 corresponds to the light load phase of the operation, since in that case the string 78 moves downwardly by gravity, and no oil is being pumped.

During the period of heavy load requirements, the link member 64 is urged toward the right as viewed in Fig. 3, to reduce the driven speed of the mechanism and thereby to reduce fluctuations in the load requirements of motor 2. During upward movement of rod 81 corresponding to light load requirements, the link member 64 is permitted to move to the left and to increase the driven speed of the mechanism.

This can be accomplished in proper synchronous timing by providing a cam 91 fixed to shaft 83. This cam 91 cooperates with a cam roller 92 journalled in a clevis 93 on the extremity of link member 64. Cam roller 92 can be maintained in contact with cam 91 by means of a compression spring 94 interposed between members 65 and 93. By appropriate design of cam 91 the periodic variations in the ratio of transmission can be accomplished to conform with the load requirements. For each revolution of shaft 83, the link member 64 is reciprocated through a cycle. During motion of link member 64 toward the right, the spring 74 is compressed, and then this spring eases off as crank 58 rotates in a clockwise direction, in response to the action of spring 74. Although compression of spring 74 can be effected rapidly by the aid of the link movement, the motion of section 50 toward section 49 takes place gradually, and without doing harm to the apparatus. Spring 74 of course is strong enough in its expanded position to maintain collar 71 in contact with bushing 73, upon termination of the adjusting period.

In the form shown, cam 91 is so arranged that predetermination of the reduction in speed ratio of the driven shaft takes place somewhat prior to the downward movement of connecting rod 81. In this way when rod 81 is being moved downwardly the speed reduction has already been accomplished.

The speed is maintained at the low value until the power requirement is reduced. At this point cam 91 has rotated to the high speed position, that is, the roller 92 has arrived at the low part of the cam. Link 64 now moves to the left in response to the force of spring 94. Spring 70 is thus compressed, urging member 66 toward the left. In response to this force the variable diameter pulleys adjust themselves, until bushing 67 and collar 68 again come into contact. The power unit continues at increased speed until the cam again reduces the speed for the down stroke of connecting rod 81.

By the use of the resilient adjusting means the adjusting periods of the cam can be made as short as desired without producing any ill effects on the variable speed power unit.

I claim:

1. In a variable diameter pulley structure, a pair of relatively axially adjustable sections having inclined faces, forming by adjustment, variable effective pulley diameters, means forming an axial tubular guide, a thrust bearing structure guided in said guide and rotatably supporting one of said sections, a spring in said guide and engaging the bearing structure, and an axially adjustable member in said guide and forming an abutment for the spring.

2. In a variable speed power unit, a driving shaft and a driven shaft, the center distance between said shafts being fixed, a pair of adjustable pulley structures in respective axial driving relation to each of said shafts, each of said pulley structures including a pair of pulley sections having opposed inclined belt engaging faces forming by relative axial adjustment variable effective pulley diameters, a belt in active driving relation to said pulley structures, means for adjusting the relative axial positions of at least the pulley sections forming one said pulley structure, means for actuating said axial adjusting means, and adjustment transmitting means interposed between said actuating means and said axial adjusting means, whereby the total adjustment initiated by said actuating means is transmitted to said axial adjusting means when the force opposing the action of said axial adjusting means falls below a fixed predetermined minimum.

3. The combination as set forth in claim 2, in which the total motion transmitted by said adjustment transmitting means, upon completion of the adjusting period, is fixed in direction and amount by said actuating means.

4. In an adjustable speed drive, a driving pulley structure, a driven pulley structure, a belt in active driving relation to said pulley structures, one of said pulley structures having an adjustable effective diameter and including a pair of pulley sections having opposed inclined belt engaging faces, forming by relative axial adjustment variable effective pulley diameters, and means for adjusting the relative axial position of said pulley sections comprising; a bearing member axially fixed with respect to one of said pulley sections, an axially movable member engaging said bearing member, means for supporting said axially movable member for axial movement and for preventing the rotation thereof, yielding force transmitting means including a pair of abutment members and resilient means for urging said abutment members into contact with each other, an adjustable member connected to one of said abutment members, and means for connecting the other of said abutment members to said axially movable member, whereby the total adjustment initiated by the adjustment of said adjustable member is transmitted in direction and amount to said axially movable member, upon rotation of the adjustable pulley structure and when the force opposing the adjustment of said axially movable member becomes less than the force urging said abutment members into contact with each other.

5. In a variable speed power unit forming a driving connection between a source of mechanical power and a load driving shaft operating under a periodically fluctuating torque, a driving shaft and a driven shaft, a pair of adjustable pulley structures in axial driving relation to said driving shaft and said driven shaft, each of said pulley structures including a pair of pulley sections having opposed inclined belt engaging faces forming by relative axial adjustment variable effective pulley diameters, a belt in active driving relation to said pulley structures, means for adjusting the relative axial positions of at least the pulley sections forming one said pulley structure, means for actuating said adjusting means by rotation of said load driving shaft, and adjustment transmitting means interposed between said actuating means and said adjusting means whereby the total adjustment initiated by said actuating means is transmitted to said adjusting means when the force opposing the action of said adjusting means falls below a fixed predetermined minimum.

6. In a variable speed power unit forming a driving connection between a source of mechanical power and a load driving shaft, a driving shaft and a driven shaft, a pair of adjustable pulley structures in axial driving relation to said driving shaft and said driven shaft, each of said pulley structures including a pair of pulley sections having opposed inclined belt engaging faces forming by relative axial adjustment variable effective pulley diameters, a belt in active driving relation to said pulley structures, means for adjusting the relative axial positions of at least the pulley sections forming one said pulley structure, means for actuating said adjusting means by rotation of said load driving shaft, said actuating means including a cam secured on said load driving shaft, a cam follower, linkage connecting the cam follower and said adjusting means, and means interposed in said linkage whereby the force transmitted by the cam to the adjusting means is limited to a predetermined value.

7. In a transmission mechanism for connecting a source of power to a load, said load including a shaft, a reciprocating member, as well as mechanism for reciprocating said member by rotation of the shaft, one revolution of the shaft causing said member to perform one cycle of reciprocation, the torque requirements of the load varying with the reversal of direction of movement of said member, a pair of pulley structures, at least one of said structures having a pair of relatively axially adjustable sections with opposed inclined faces, forming by adjustment, variable effective pulley diameters, a wedge shaped belt having sides respectively engaging said inclined faces; and means for mechanically axially adjusting at least one of said sections, said means comprising a crank, a link connected to the crank, and means operated by the shaft in substantial synchronism with the movement of the reciprocating member for moving the link.

8. In a transmission mechanism for connecting a source of power to a load, said load including a member, as well as mechanism for reciprocating said member by the source of power, the torque requirement of the load cyclically varying with the reversal of the direction of movement of said member, a pair of pulley structures, at least one of said structures having a pair of relatively axially adjustable sections with opposed inclined faces forming by adjustment, variable effective pulley diameters, a wedge shaped belt having sides respectively engaging the inclined faces, and a mechanism including a link structure for axially moving at least one of said sections in substantial synchronism with the movement of said member, said link structure having telescopically compressible portions.

9. In a transmission mechanism for connecting a source of power to a load, said load including a shaft, a member, as well as mechanism for reciprocating said member by rotation of the shaft, one revolution of the shaft causing said member to perform one cycle of reciprocation, the torque requirements of the load varying with the reversal of direction of movement of said member, a pair of pulley structures, at least one of said structures having a pair of relatively axially adjustable sections with opposed inclined faces, forming by adjustment, variable effective pulley diameters, a wedge shaped belt having sides respectively engaging said inclined faces; and means for mechanically axially adjusting at least one of said sections, said means including a link structure for axially moving at least one of said sections, said link structure having telescopically compressible portions, and means interposed between said shaft and the link whereby the link is caused to move said section in substantial synchronism with the movement of the member.

10. In a variable ratio transmission mechanism, having a rotary part, and arranged between a source of mechanical power and a load having periodically fluctuating torque requirements, a variable diameter pulley structure having a pair of relatively axially adjustable sections with opposed inclined faces, forming by adjustment, varable effective pulley diameters, a wedge shaped belt having sides respectively engaging said inclined faces, and means interposed between the rotary part of the drive mechanism and at least one of said axially movable sections; for periodically adjusting said section, said means including a link structure having two resilient members. each stressed to an initial predetermined value whereby said link structure acts as a mechanically rigid body in transmitting tension or compression forces less than a predetermined minimum and whereby motions, transmitted by said link structure, which encounter opposing forces greater than this minimum value are delayed in transmission until said opposing forces are reduced to said predetermined minimum.

GEORGE T. PFLEGER.